(12) United States Patent
Hristov

(10) Patent No.: US 7,388,976 B2
(45) Date of Patent: Jun. 17, 2008

(54) TIME-BASED SYSTEM TO LINK PERIODIC X-RAY IMAGES

(75) Inventor: Dimitre Hristov Hristov, Pleasant Hill, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 695 days.

(21) Appl. No.: 10/796,733

(22) Filed: Mar. 9, 2004

(65) Prior Publication Data

US 2005/0201604 A1 Sep. 15, 2005

(51) Int. Cl.
*G06K 9/00* (2006.01)

(52) U.S. Cl. .................... 382/131; 382/284

(58) Field of Classification Search .......... 382/128, 382/129, 130, 131, 132, 133, 134, 298; 378/4, 378/21, 23, 24, 25, 26, 27, 98.4, 98.6, 98.9, 378/101, 901, 20, 57, 63; 600/425, 407, 600/410, 254, 443

See application file for complete search history.

(56) References Cited

U.S. PATENT DOCUMENTS

| | | | |
|---|---|---|---|
| 5,329,567 A | 7/1994 | Ikebe | |
| 5,383,231 A * | 1/1995 | Yamagishi | 378/15 |
| 5,412,562 A * | 5/1995 | Nambu et al. | 378/10 |
| 6,051,376 A | 4/2000 | Fisher et al. | |
| 6,214,544 B1 | 4/2001 | Fisher | |
| 6,381,487 B1 * | 4/2002 | Flohr et al. | 600/425 |
| 6,426,987 B2 | 7/2002 | Nakamura et al. | |
| 6,522,712 B1 * | 2/2003 | Yavuz et al. | 378/4 |
| 6,535,570 B2 | 3/2003 | Stergiopoulos et al. | |
| 6,546,072 B1 | 4/2003 | Chalmers | |
| 6,563,941 B1 * | 5/2003 | O'Donnell et al. | 382/131 |
| 6,623,922 B1 | 9/2003 | Kamb et al. | |
| 6,780,152 B2 | 8/2004 | Ustuner et al. | |
| 6,842,502 B2 * | 1/2005 | Jaffray et al. | 378/65 |
| 6,865,248 B1 * | 3/2005 | Rasche et al. | 378/8 |
| 7,054,406 B2 * | 5/2006 | Ikeda et al. | 378/8 |
| 7,158,610 B2 | 1/2007 | Mostafavi | |

OTHER PUBLICATIONS

Smith et al., Genetic footprinting: A genomic strategy for determining a gene's function given its sequence, *Proc. Natl. Acad. Sci. USA*, vol. 92, pp. 6479-6483 (1995).

Adi Kimchi, Cytokine Triggered Molecular Pathways That Control Cell Cycle Arrest, *Journal of Cellular Biochemistry*, vol. 50, pp. 1-9 (1992).

Deiss et al., Cathepsin D protease mediates programmed cell death induced by interferon-$\gamma$, Fas/APO-1 and TNF-$\alpha$, *The EMBO Journal*, vol. 15, No. 15, pp. 3861-3870 (1996).

Lisitsyn et al., Comparative genomic analysis of tumors: Detection of DNA losses and amplification, *Proc. Natl. Acad. Sci. USA*, vol. 92, pp. 151-155, (1995).

(Continued)

*Primary Examiner*—Abolfazi Tabatabai

(57) ABSTRACT

A system includes acquisition of a plurality of images of a first portion of a body undergoing substantially periodic motion, each of the plurality of images associated with a respective time, determination of a correlation between at least two of the plurality of images, and determination of a period of the periodic motion based on the respective times associated with the at least two of the plurality of images.

40 Claims, 17 Drawing Sheets

OTHER PUBLICATIONS

Yancopoulos et al., Isolation of coordinately regulated genes that are expressed in discrete stages of B-cell development, *Proc. Natl. Acad. Sci. USA*, vol. 87, pp. 5759-5763 (1990).

Lee et al., Positive selection of candidate tumor-suppressor genes by subtractive hybridization, *Proc. Natl. Acad. Sci. USA*, vol. 88, pp. 2825-2829 (1991).

Diatchenko et al., Suppression subtractive hybridization: A method for generating differentially regulated or tissue-specific cDNA probes and libraries, Proc. Natl. Acad. Sci. USA, vol. 93, pp. 6025-6030 (1996).

Hubank et al., Identifying differences in mRNA expression by representational difference analysis of cDNA, *Nucleic Acids Research*, vol. 22, No. 25, pp. 5640-5648 (1994).

Braun et al., Identification of Target Genes for the Ewing's Sarcoma EWS/FLI Fusion Protein by Representational Difference Analysis, *Molecular and Cellular Biology*, vol. 15, No. 8, pp. 4623-4630 (1995).

Gudkov et al., Isolation of genetic suppressor elements, inducing resistance to topoisomerase II-interactive cytotoxic drugs, from human topoisomerase II cDND, *Proc. Natl. Acad. Sci. USA*, vol. 90, pp. 3231-3235 (1993).

Gudkov et al., Cloning mammalian genes by expression selection of genetic suppressor elements: Association of kinesin with drug resistance and cell immortalization, *Proc. Natl. Acad. Sci. USA*, vol. 91, pp. 3744-3748 (1994).

Kissil et al., Isolation of DAP3, a Novel Mediator of Interferon-γ-induced Cell Death, *The Journal of Biological Chemistry*, vol. 270, No. 46, pp. 27932-27936 (1995).

\* cited by examiner

US 7,388,976 B2

TIME-BASED SYSTEM TO LINK PERIODIC X-RAY IMAGES

CROSS-REFERENCE TO RELATED APPLICATIONS

The present application is related to commonly-assigned, co-pending U.S. patent application Ser. Nos., entitled "System to Link Periodic X-Ray Images", filed concurrently herewith.

BACKGROUND

1. Field

The embodiments described below relate generally to imaging, and may be applied to systems for generating in vivo images.

2. Description

Computed tomography (CT) systems are commonly used to generate images of an internal portion of a body. Generally, CT systems include an X-ray source and a radiation receiver that are mounted to face one another on opposite sides of a ring. A body is positioned within the ring so that a portion of interest lies between the X-ray source and the radiation receiver. The X-ray source then emits X-ray radiation that passes through the portion of interest and is received by the radiation receiver.

The receiver produces a set of data that represent the attenuative properties of tissues that lie between the X-ray source and the receiver. This set of data comprises a projection image. The ring is then rotated in order to rotate the X-ray source and the radiation receiver around the portion of interest. During the rotation, the X-ray source transmits radiation toward the receiver and the receiver produces projection images corresponding to various rotational angle positions. A three-dimensional image may be generated from the projection images using known reconstruction techniques.

Most reconstruction techniques assume that the spatial distribution of the portion of interest's linear attenuation coefficient is identical for all projections. This assumption does not hold if the portion of interest is in motion during acquisition of the projection images. Therefore, in the case of periodic motion (e.g., resulting from breathing motion, heart beat, etc.), some reconstruction methods attempt to acquire projection images that each correspond to a same phase of the motion.

A common approach to acquire such projection images includes time-stamping the projection images during their acquisition and extracting subsets of the images such that each image in a subset corresponds to the same phase. The subsets are extracted by comparing the time-stamps of the images with an external temporal physiological or anatomical signal that is measured with an external device. A slice image may be reconstructed for a phase using the subset of projection images that corresponds to the phase. Moreover, slice images for several phases may be reconstructed and combined into an animated image showing movement of the portion of interest over several phases.

The above approach assumes that the temporal pattern of the signals is representative of the temporal pattern of the periodically moving anatomy. Accordingly, such approaches may not provide required accuracy. In addition, these approaches require additional devices for monitoring the physiological or anatomical signal, some discomfort due to the attachment of the monitoring devices to the patient, and/or additional time for patient setup.

SUMMARY

To address at least the foregoing, some embodiments provide a system, method, apparatus, and means to acquire a plurality of images of a first portion of a body undergoing substantially periodic motion, each of the plurality of images associated with a respective time, to determine a correlation between at least two of the plurality of images, and to determine a period of the periodic motion based on the respective times associated with the at least two of the plurality of images.

In some aspects, the plurality of images comprises three-dimensional cross-sectional images of the first portion of the body. Further aspects may determine the correlation via a determination that the at least two of the plurality of images represent substantially a same phase of the periodic motion.

According to additional aspects, an image of a second portion of the body is acquired at a time substantially equal to a time associated with one of the at least two of the plurality of images plus an integer multiple of the determined period. Further, a combined image may be generated based on the at least two of the plurality of images, and a second combined image may be generated based on the combined image and the image of the second portion of the body.

Further aspects may include acquisition of a second plurality of images of a second portion of the body, each of the second plurality of images associated with a respective time, determination of a correlation between at least two of the second plurality of images, and determination of the period of the periodic motion based on the respective times associated with the at least two of the second plurality of images.

Moreover, aspects may include acquisition of a second plurality of images of a second portion of the body, each of the second plurality of images associated with a respective time substantially equal to a time associated with one of the plurality of images of the first portion of a body plus an integer multiple of the determined period. In addition to the foregoing aspect, a combined image may be generated based on the at least two of the plurality of images, a second combined image may be generated based on at least two of the second plurality of images, each of the at least two of the second plurality of images associated with a time substantially equal to a time associated with one of the at least two of the plurality of images of the first portion of a body plus an integer multiple of the determined period, and a third combined image may be generated based on the combined image and the second combined image.

The claimed invention is not limited to the disclosed embodiments, however, as those in the art can readily adapt the description herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION

The following description is provided to enable any person skilled in the art to make and use the claimed invention and sets forth the best mode contemplated by the inventors for carrying out the claimed invention. Various modifications, however, will remain readily apparent to those in the art.

Figure 1:
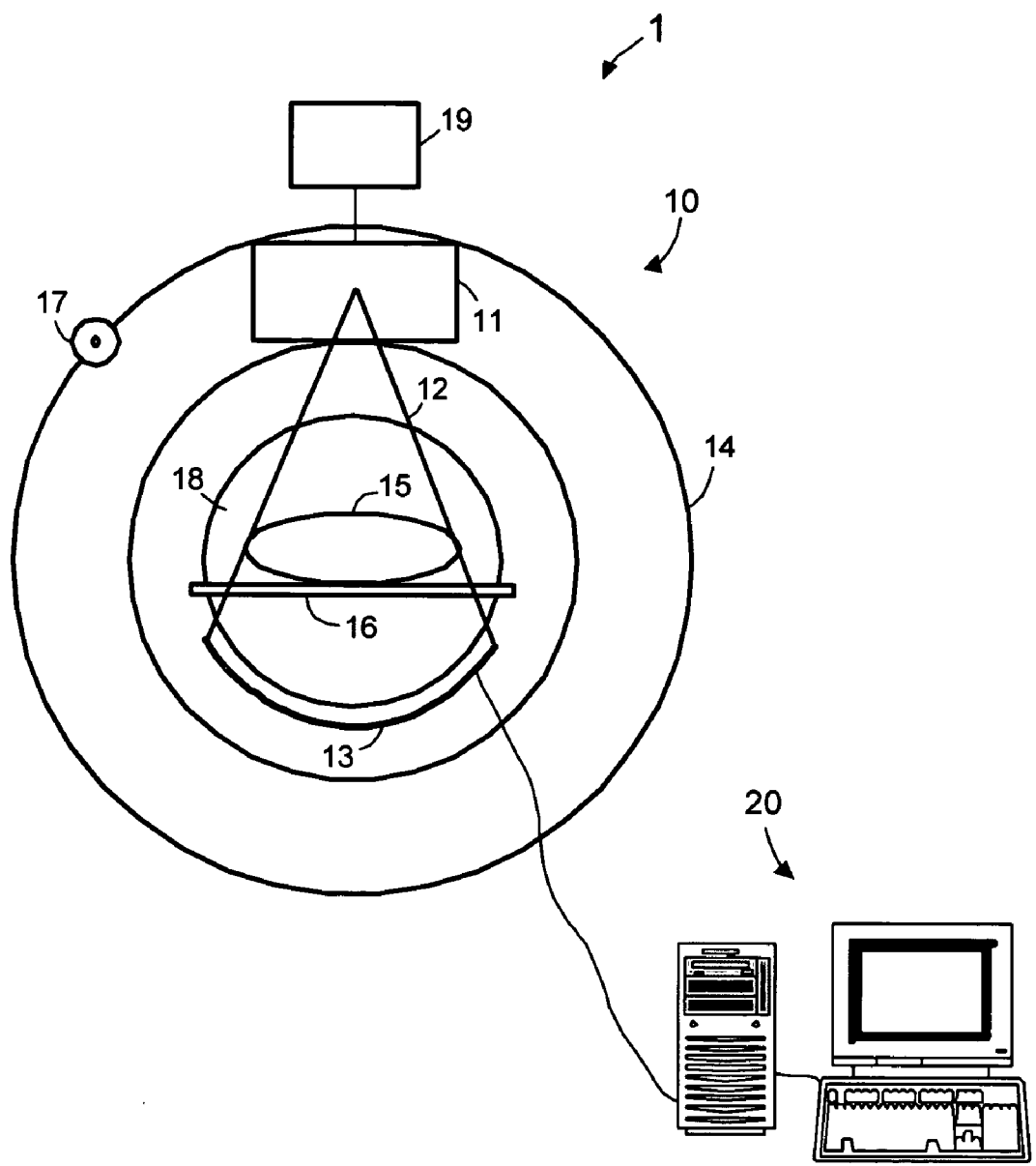
FIG. 1 is a diagram illustrating an image acquisition system according to some embodiments.

FIG. 1 illustrates CT system 1 according to some embodiments. CT scanner 10 is located in a CT room and may be used to generate images of a body according to some embodiments. CT scanner 10 includes X-ray source 11 for emitting fan-shaped X-ray beam 12 toward radiation receiver 13. Both X-ray source 11 and radiation receiver 13 are mounted on ring 14 such that they may be rotated through 360 degrees while maintaining the physical relationship therebetween.

In general operation, body 15 is positioned on bed 16 to place a portion of the body between X-ray source 11 and radiation receiver 13. Next, X-ray source 11 and receiver 13 are rotated by rotation drive 17 around cavity 18 in which body 15 lies. During this rotation, X-ray source 11 is powered by high-voltage generator 19 to transmit X-ray radiation toward receiver 13. Receiver 13 receives the radiation and produces a set of data for each projection angle. The sets of data may be considered images of the portion of body 15 that are acquired at each projection angle.

Each set of data is transmitted to computer system 20. Computer system 20 calculates attenuation coefficients (e.g., Hounsfield numbers) of predetermined points based on the data sets. Accordingly, the data represents the attenuative properties of tissues at each point of the represented portions. The attenuation coefficients may be used to generate an image representing the portion of body 15 that lies between X-ray source 11 and radiation receiver 13. The image may be a three-dimensional or two-dimensional ("slice") image, or any other type of image according to some embodiments.

Figure 2:
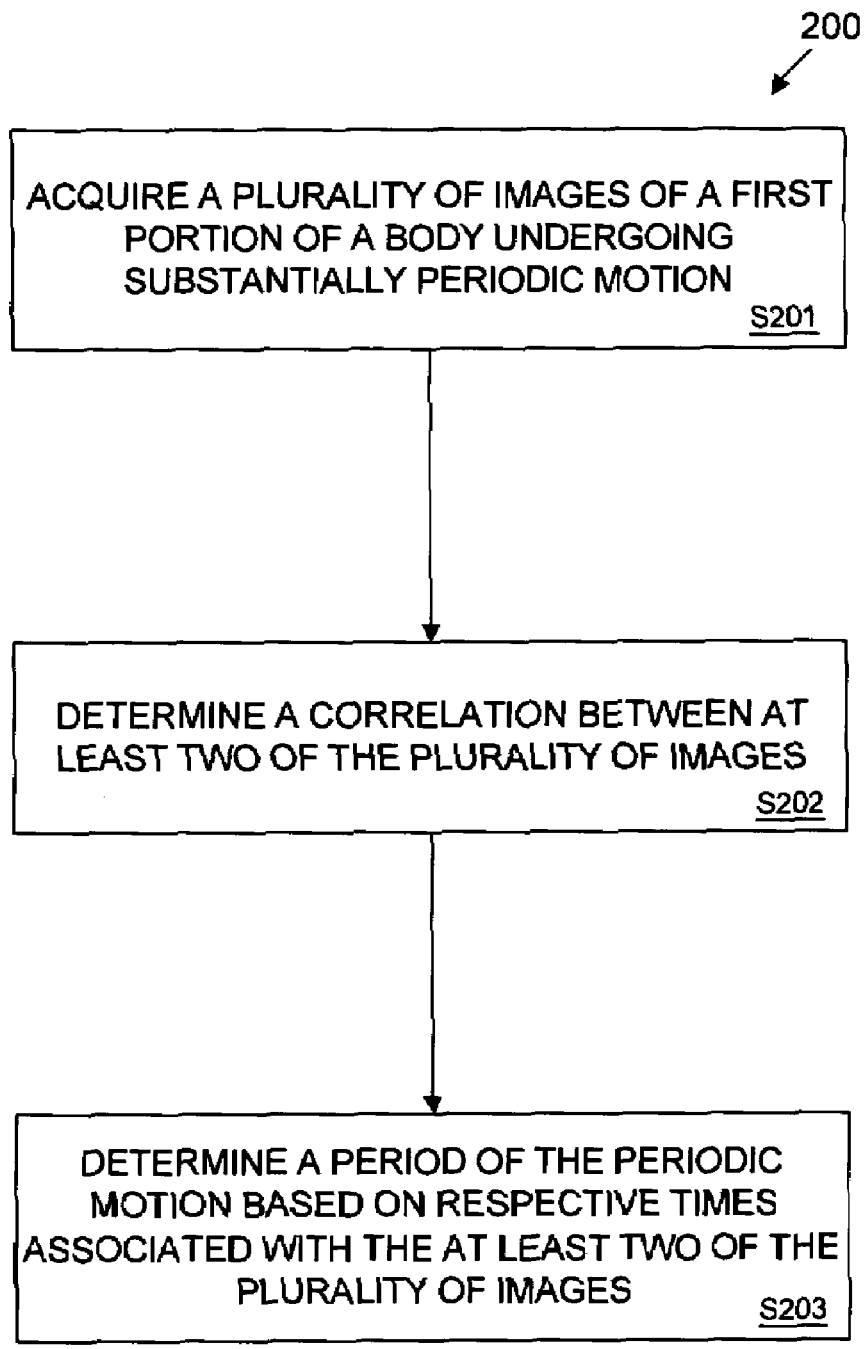
FIG. 2 comprises a flow diagram illustrating process steps according to some embodiments.

FIG. 2 is a flow diagram of process steps 200 executed by system 1 according to some embodiments. Process steps 200 may be used to estimate a period of motion of a body according to some embodiments. Process steps 200 may be embodied, in whole or in part, by hardware of and/or software executed by elements including but not limited to those of CT scanner 10 and computer system 20. Software embodying process steps 200 may be stored by any medium, including a fixed disk, a floppy disk, a CD-ROM, a DVD-ROM, a Zip™ disk, a magnetic tape, or a signal. Some or all of such software may also be stored in one or more devices.

Initially, at step S201, a plurality of images is acquired. The images represent a first portion of a body undergoing substantially periodic motion. In some embodiments, the body is a living being and the periodic motion results from physiological process such as heartbeat and/or respiration.

The plurality of images may comprise three-dimensional cross-sectional images of the first portion of the body taken perpendicular to the major axis of bed 16. Such an image may be acquired using currently- or hereafter-known techniques for reconstructing the sets of data acquired by receiver 13 as described above. The reconstruction may be performed by CT scanner 10 and/or computer system 17 according to some embodiments.

Figure 3:
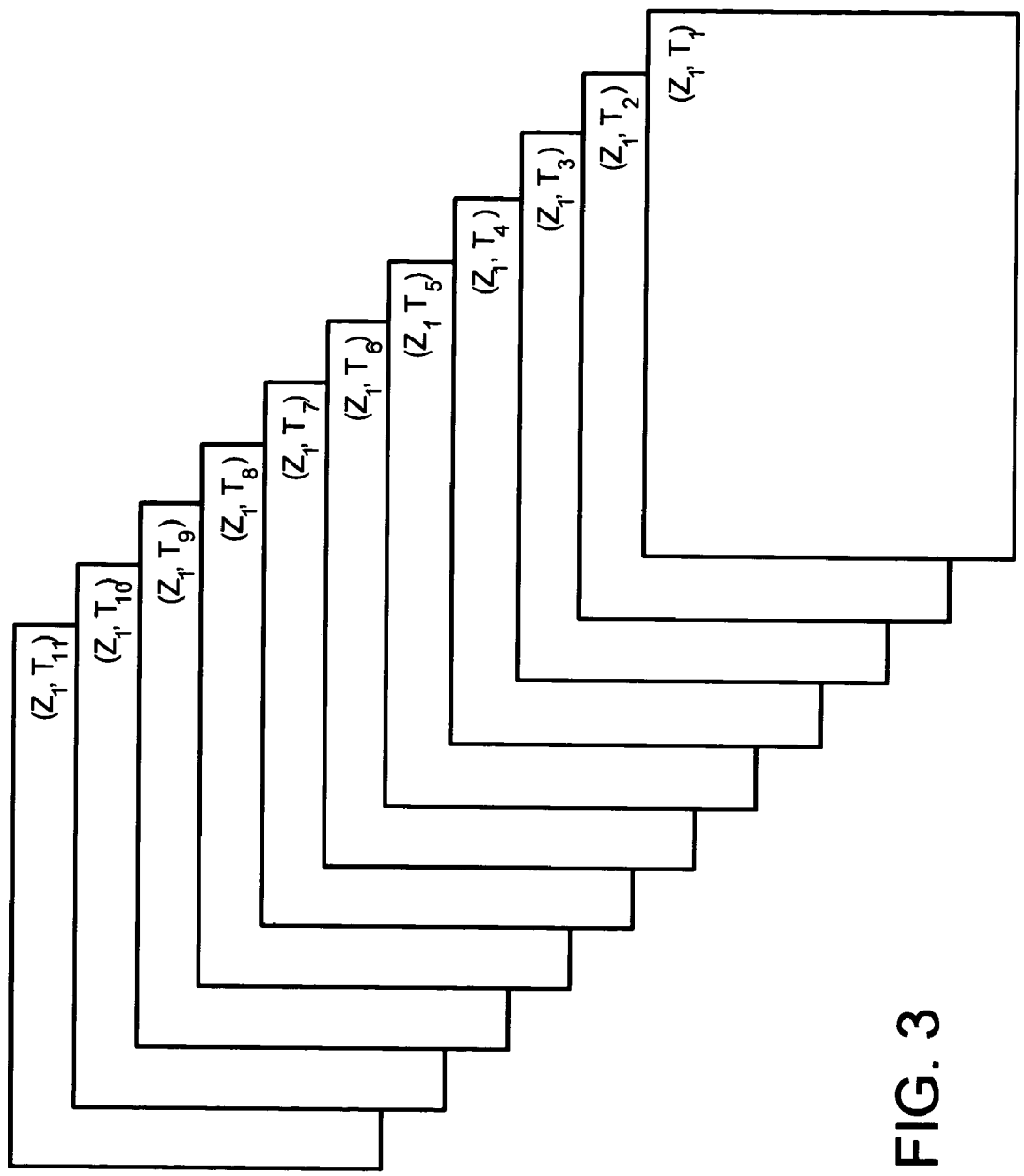
FIG. 3 includes representations of a plurality of images acquired according to some embodiments.

FIG. 3 includes representations of the acquired images according to some embodiments. Each image is associated with a (position, time) coordinate. The position value associated with a particular image indicates a position along the major (Z) axis of bed 16 at which the particular image was acquired. The associated time value may comprise a timestamp indicating a time at which the image was acquired.

Returning to process steps 200, a correlation between at least two of the acquired images is determined in step S202. The correlation may be determined by first determining a similarity between a first acquired image and each other image. Any image similarity measure may be used, including but not limited to an absolute value of pixel differences and cross-correlation. A correlation is then determined between the first acquired image and one or more other images that share a highest similarity with the first image.

Figure 4:
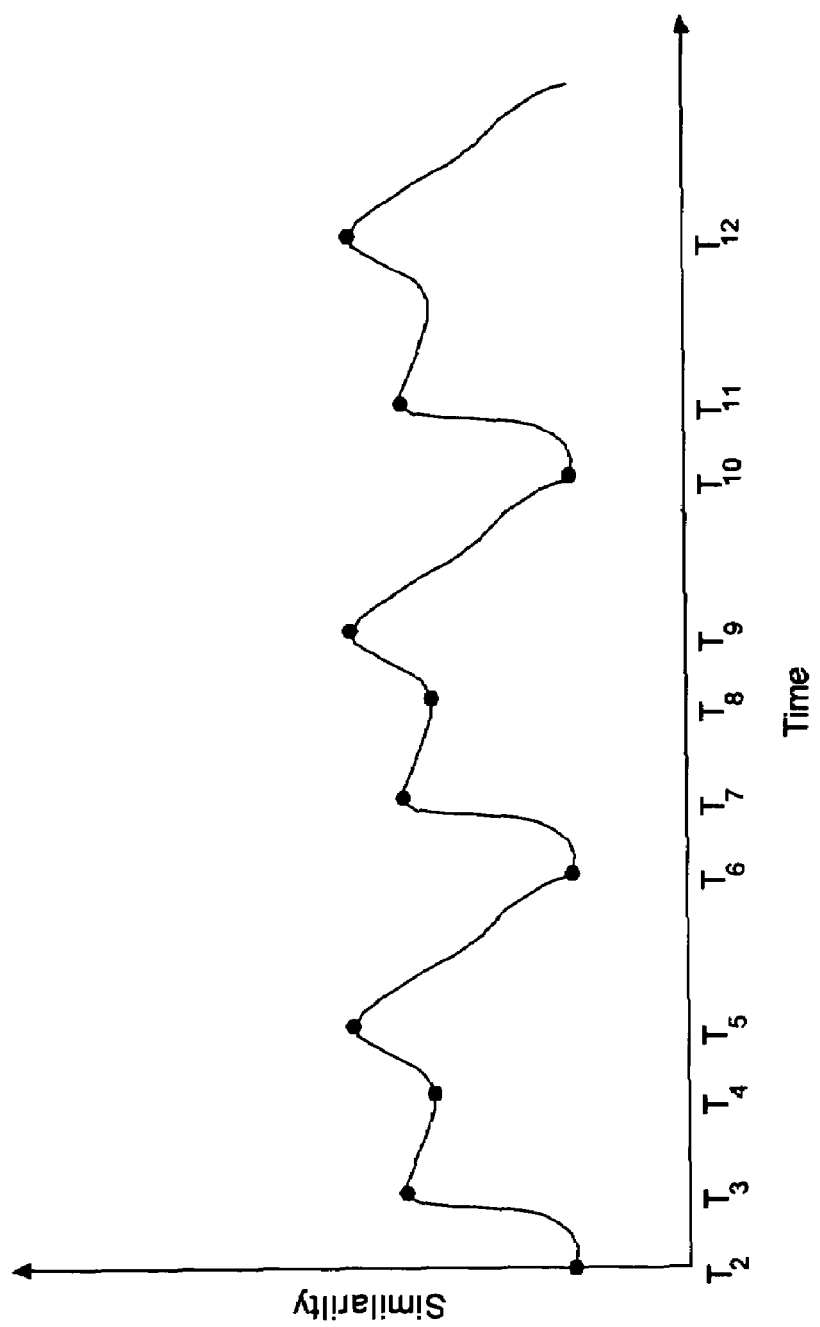
FIG. 4 is a waveform depicting periodic motion of a body according to some embodiments.

FIG. 4 is a graph showing a similarity of the acquired images according to some embodiments. The graph shows an indication of similarity between image $(Z_1, T_1)$ and each other of the FIG. 3 images. As shown, the similarity is highest for images $(Z_1, T_5)$ and $(Z_1, T_9)$. Therefore, a correlation is determined between images $(Z_1, T_1)$, $(Z_1, T_5)$ and $(Z_1, T_9)$ in step S202.

A period of the body's periodic motion is determined in step S203. The period is determined based on respective times that are associated with the at least two of the plurality of images between which a correlation was determined in step S202. Continuing with the above example, the period is equal to $T_5-T_1$ and $T_9-T_5$.

Figure 5:
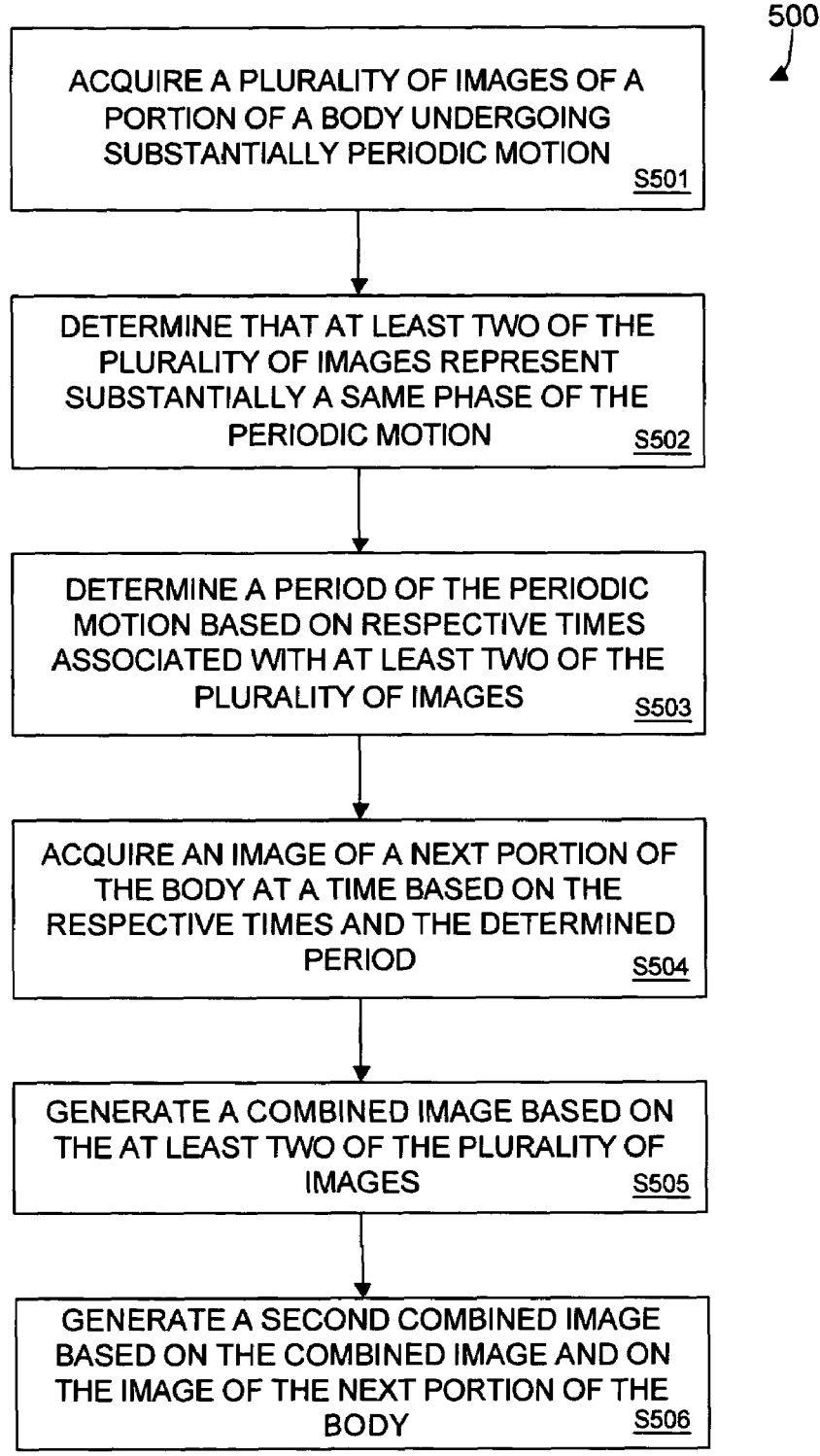
FIG. 5 comprises a flow diagram illustrating process steps according to some embodiments.

FIG. 5 is a flow diagram of process steps 500 executed by system 1 according to some embodiments. Process steps 500 may be used to generate and link images of different portions of a body according to some embodiments. Process steps 500 may be embodied as described above with respect to process steps 200.

At step S501, a plurality of images of a portion of a body undergoing substantially periodic motion is acquired. Next, in step S502, it is determined that at least two of the images represent substantially a same phase of the periodic motion. This determination may proceed by determining a correlation between at least two images as described with respect to step S202 of process steps 200. Other systems may be used in the step S502 determination, including but not limited to identification of images in which a particular structure or structures are positioned substantially identically.

A period of the periodic motion is then determined in step S503. The period may be determined based on respective times associated with the at least two images. For example, the period may be determined to be substantially equal to a difference in the times associated with sequential ones of the at least two images. Using the example of process steps 200, the period may be determined to be substantially equal to $T_5-T_1$ and $T_9-T_5$.

Next, in step S504, an image of a next portion of the body is acquired. The image is acquired based on the determined period and on the times associated with at least one of the images identified in step S502. According to some embodiments of step S504, a relative position of body 15 with respect to X-ray source 11 and radiation receiver 13 is changed such that the next portion of body 15 is positioned between source 11 and receiver 13. X-ray source 11 and radiation receiver 13 are then rotated and operated as described above to acquire an image of the next portion of the body.

The next image may be obtained at a time equal to a time associated with one of the images identified in step S502 plus an integer multiple of the determined period. For example, it will be assumed that the identified images are images $(Z_1, T_5)$ and $(Z_1, T_9)$ of FIG. 3. Accordingly, the image of the next portion of body 15 may be acquired at time $T_{12}$ shown in FIG. 4. As shown, time $T_{12}$ is substantially equal to time $T_9$ (or time $T_5$) plus an integer multiple of the determined period.

A combined image is generated in step S505 based on the at least two images identified in step S502. The combined image may be generated using any currently- or hereafter-known methods for combining two or more images, including adding or averaging pixel values of each image. In some embodiments, the images are acquired in step S501 by setting a tube current of X-ray source 11 to less than or equal to half of a standard tube current used for imaging, and by acquiring the images based on the current. For example, the tube current may be set to one-third of the standard tube current if images are acquired in step S501 over three periods of the periodic motion. Combining the identified two or more images may thereby result in a combined image having an image quality equivalent to an image quality that is obtained using standard tube current.

Figure 6:
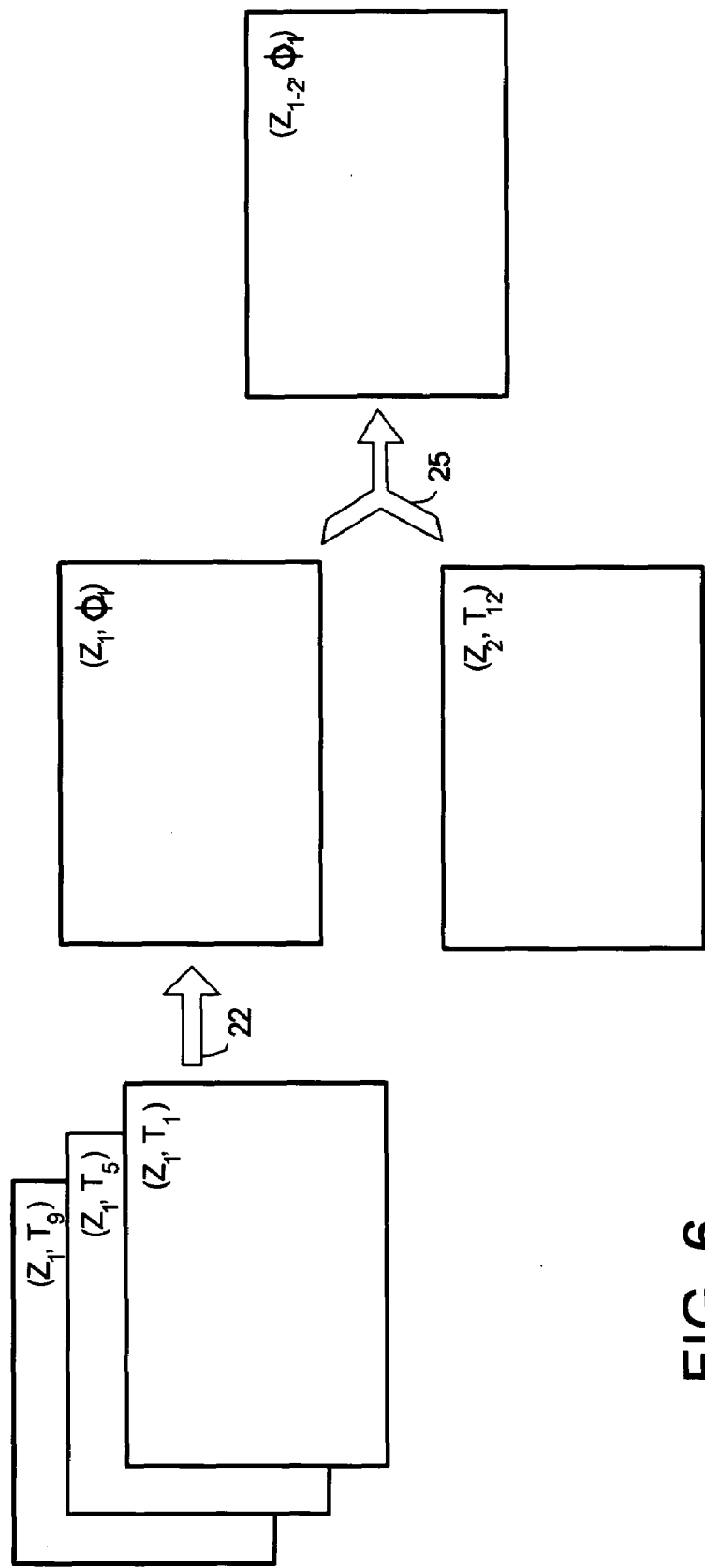
FIG. 6 depicts the combination of a plurality of images to generate a combined image according to some embodiments.

FIG. 6 illustrates the combination of images in step S505. Arrow 22 indicates the combination of images $(Z_1, T_1)$, $(Z_1, T_5)$ and $(Z_1, T_9)$ into combined image $(Z_1, \Phi_1)$. Since each of its component images correspond to a same phase of the periodic motion of body 15, combined image $(Z_1, \Phi_1)$ is labeled to indicate that it corresponds to a first phase of the periodic motion.

A second combined image is generated in step S506 based on the combined image and on the image acquired in step S504. Arrow 25 of FIG. 6 indicates the combination of combined image $(Z_1, \Phi_1)$ with image $(Z_2, T_{12})$ acquired in step S504 to generate second combined image $(Z_{1-2}, \Phi_1)$. Again, since image $(Z_2, T_{12})$ corresponds to a same phase of the periodic motion as $(Z_1, T_1)$, $(Z_1, T_5)$ and $(Z_1, T_9)$, the second combined image is also labeled to indicate that it corresponds to the first phase of the periodic motion. The label also indicates that the second combined image represents the first portion and the second portion of the body as positioned during the first phase of motion.

According to some embodiments, a plurality of images of the second portion is acquired in step S504. It may then be determined that at least two of the images substantially represent a same phase of motion as described with respect to step S502, and the period of motion may be determined based thereon as described with respect to step S503. The determined period may be used to update the period determined in step S502.

In some cases where a plurality of images are acquired in step S504, step S504 may be repeated sequentially until a plurality of images are acquired for each portion of an entire volume of interest. Combined images corresponding to each phase of motion may then be generated in step S505 for each portion of the volume. Finally, combined images corresponding to each phase may be combined in step S506 to create a three-dimensional image of the entire volume for each phase of motion. The images may be displayed sequentially over time to provide a four-dimensional representation of the volume undergoing periodic motion.

Figure 7:
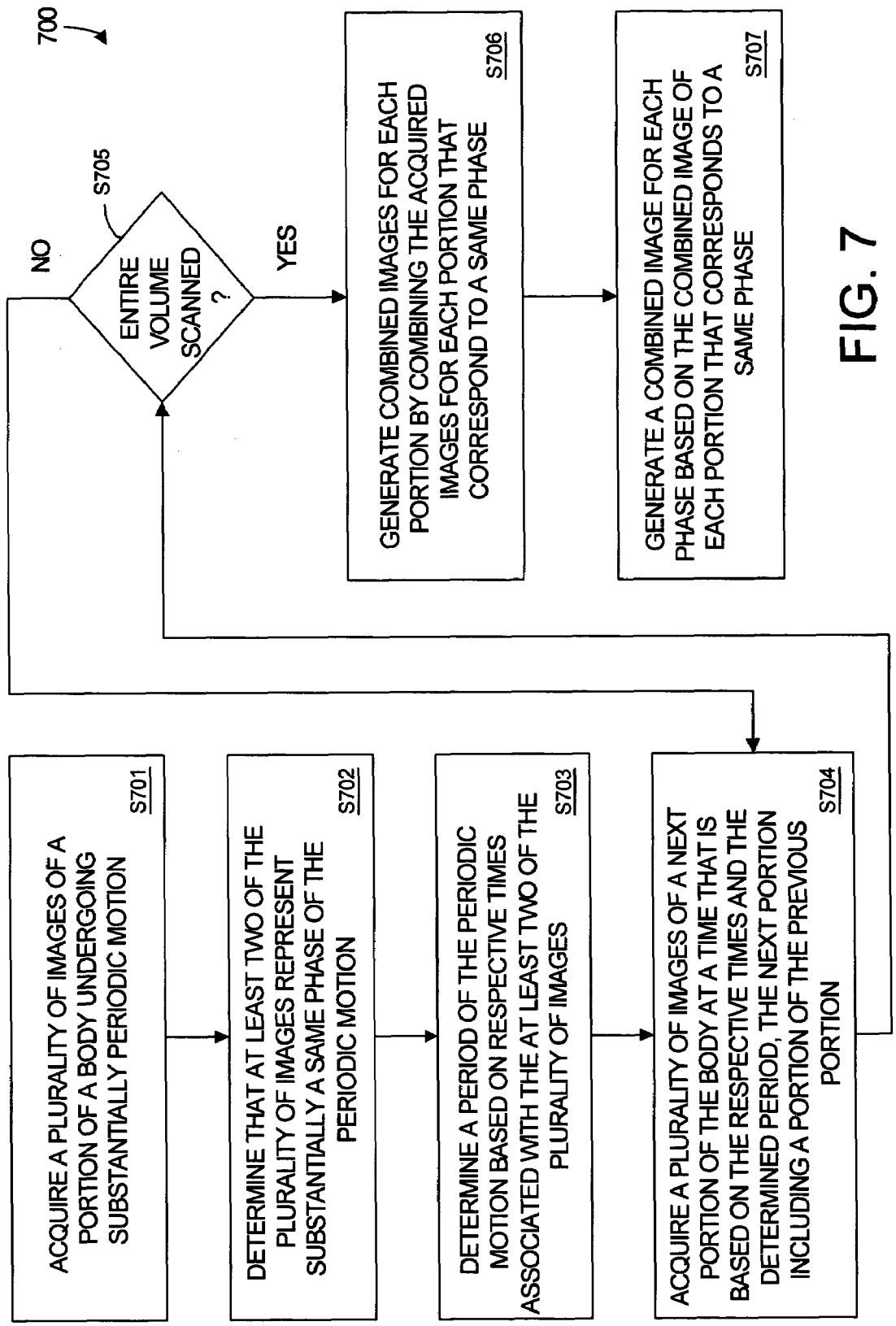
FIG. 7 comprises a flow diagram illustrating process steps according to some embodiments.

FIG. 7 is a flow diagram of process steps 700 which include some of the alternative features mentioned above. Process steps 700 may be used to generate and link images of different portions of a body according to some embodiments. Process steps 700 may be embodied as described above with respect to process steps 200 and/or 500.

Steps S701 through S703 may proceed generally as described above with respect to steps S501 through S503, respectively. For the example below, it will be assumed that images $(Z_1, T_1)$ through $(Z_1, T_{11})$ of FIG. 3 are acquired in step S701, images $(Z_1, T_1)$, $(Z_1, T_5)$ and $(Z_1, T_9)$ are identified in step S702, and a period of $T_5-T_1$ is determined in step S703.

Figure 8:
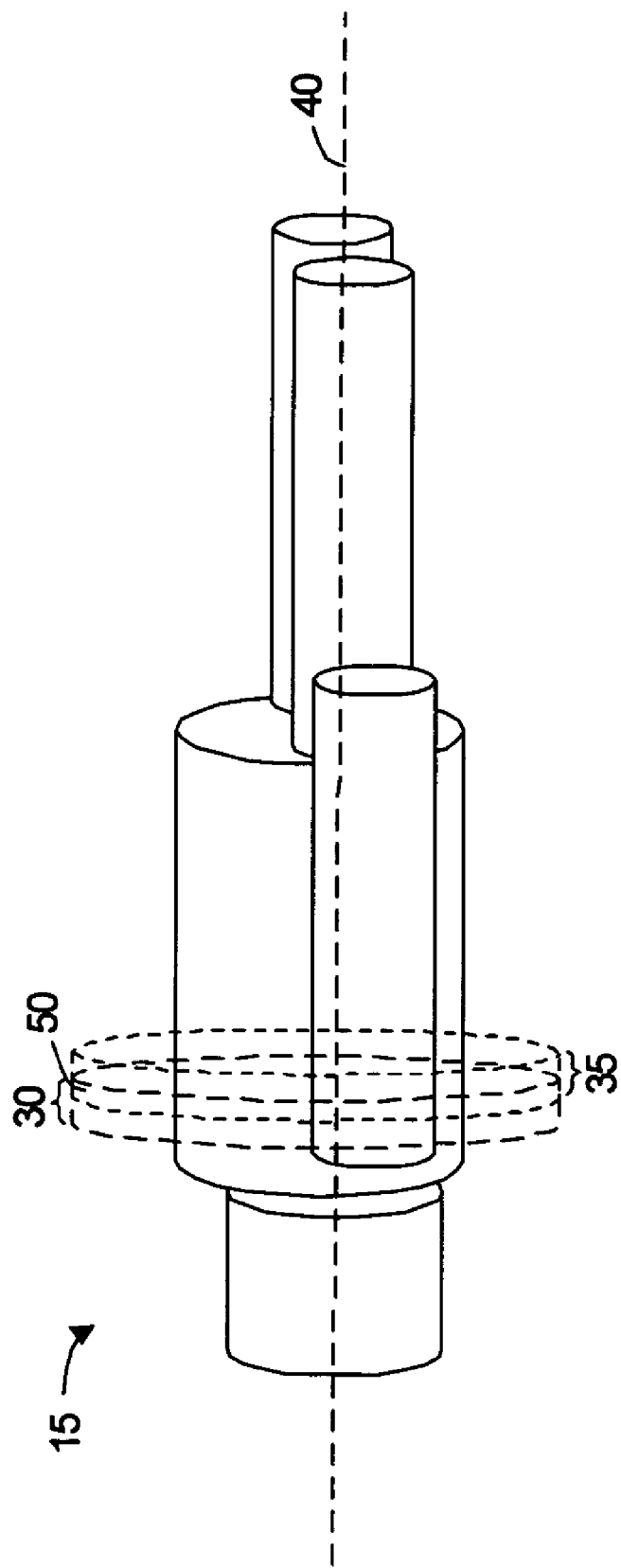
FIG. 8 illustrates two portions of a body that are imaged according to some embodiments.

In step S704, a plurality of images of a next portion of the subject body is acquired. The next portion may include a portion of the first portion of which images were acquired in step S701. FIG. 8 illustrates the first portion and the next portion according to some embodiments. FIG. 8 shows body 15 undergoing periodic motion. First portion 30 and second portion 35 each comprise a cylindrical volume. Each cylindrical volume shares axis 40 with body 15. Portion 50 is included in both first portion 30 and second portion 35, and also comprises a cylindrical volume sharing axis 40.

Figure 9:
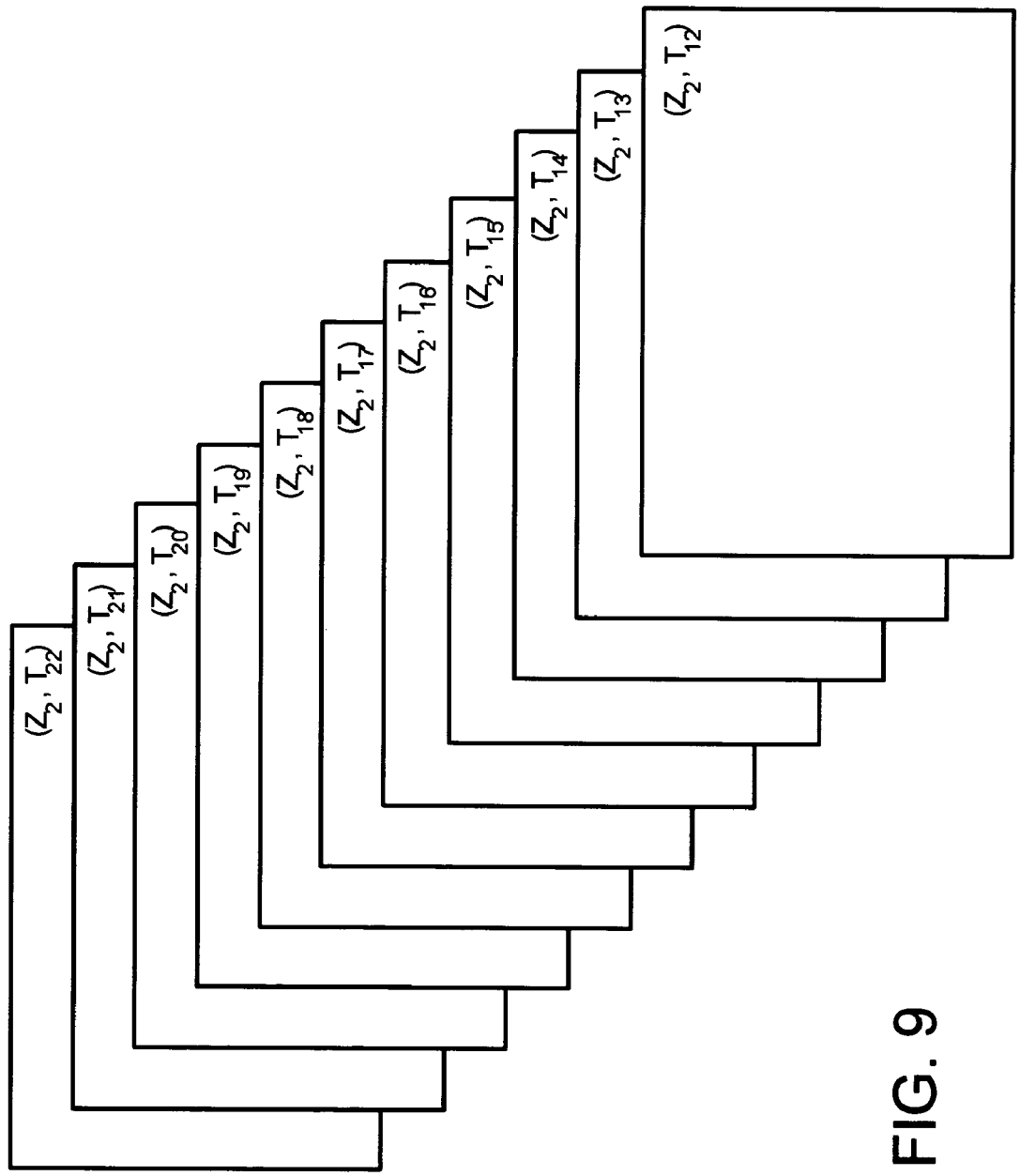
FIG. 9 includes representations of a plurality of images acquired according to some embodiments.

FIG. 9 includes representations of the plurality of images acquired in step S704. The images are all associated with the label "$Z_2$" because each image is associated with second portion 35. In the present example, images $(Z_2, T_{12})$, $(Z_2, T_{16})$ and $(Z_2, T_{20})$ are associated with times based on $T_1$, $T_5$ and $T_9$ and the period $T_5-T_1$. More specifically, each of times $T_{12}$, $T_{16}$ and $T_{20}$ are equal to $T_1+N(T_5-T_1)$, where N is an integer.

After step S704, it is determined whether an entire volume of interest has been scanned in step S705. If not, flow returns to step S704 to acquire a plurality of images of a next portion of the body. Again, two or more of the images are acquired at times that are based on respective times of previously-acquired images and a previously-determined period. Flow continues from step S705 to step S706 once it is determined that an entire volume of interest has been scanned.

Figure 10:
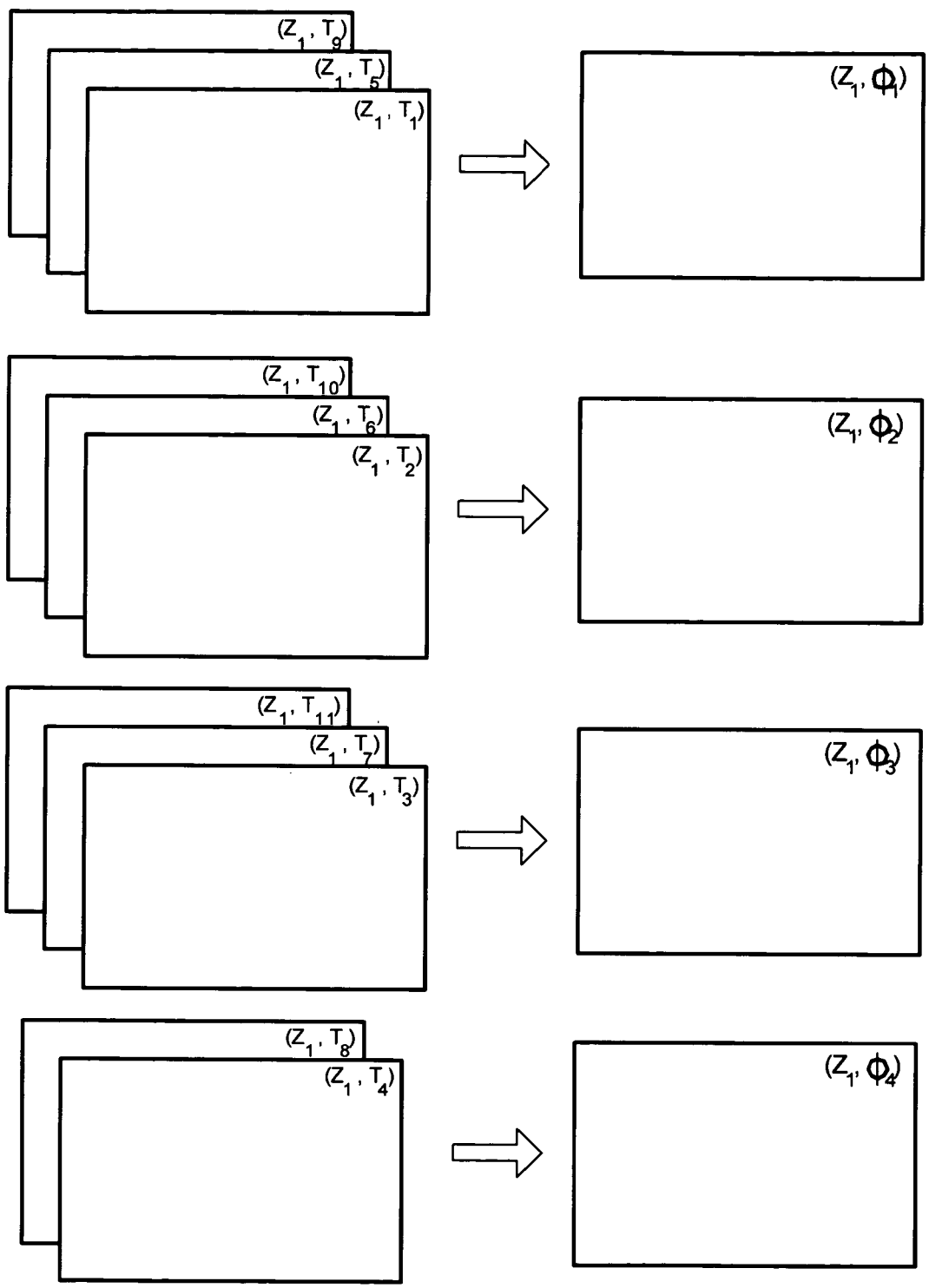
FIG. 10 depicts the combination of a plurality of images to generate a combined image according to some embodiments.

At step S706, combined images are generated for each portion by combining acquired images for each portion that correspond to a same phase. FIG. 10 illustrates step S706 as executed with respect to first portion 30. The images of first portion 30 are grouped based on their associated phases of motion, and each group is combined to generate a combined image corresponding to a single phase of motion. In the present example, the images of second portion 35 are similarly grouped and combined to generate combined images, each corresponding to a single phase of motion.

Figure 11:
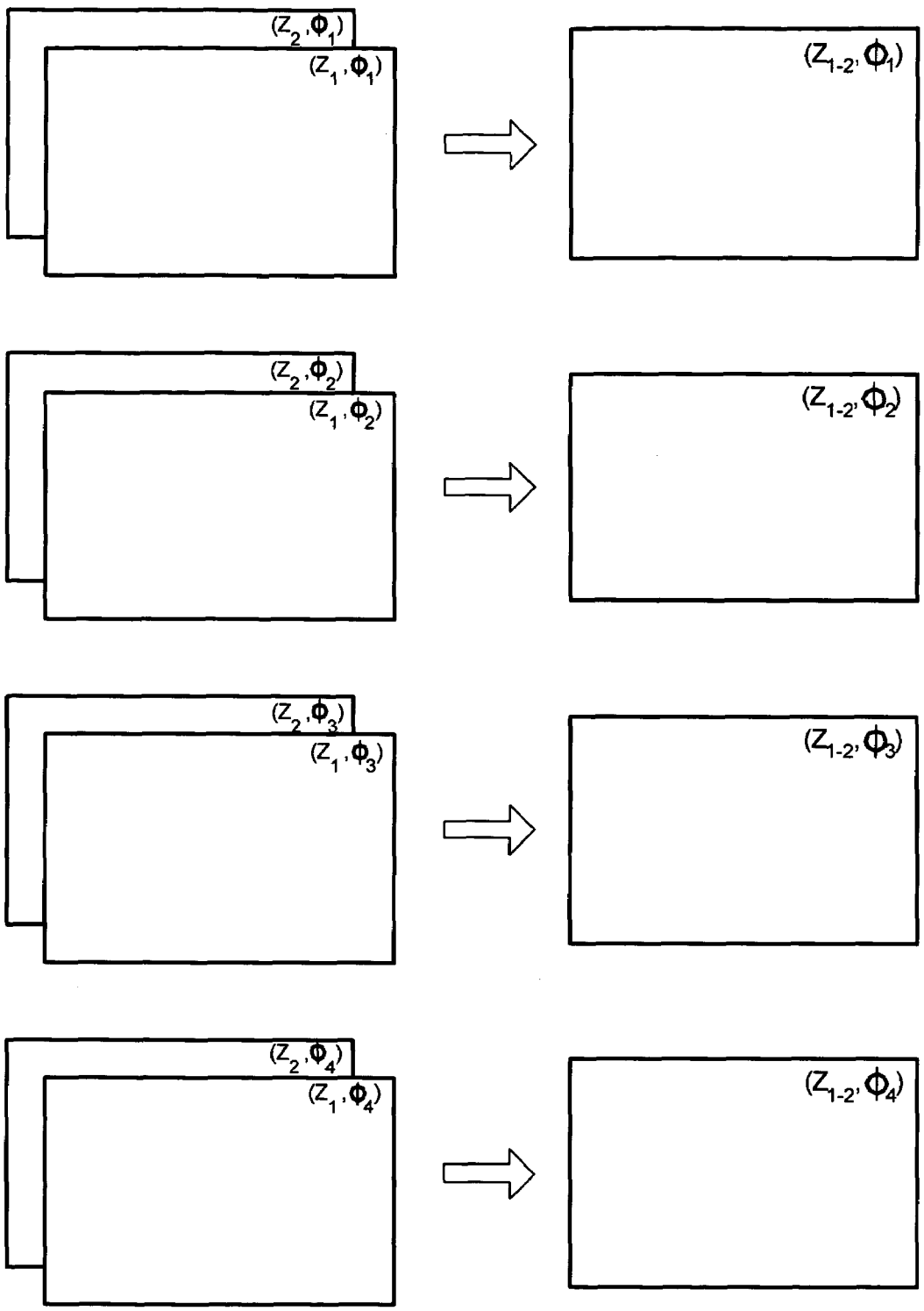
FIG. 11 depicts the combination of a plurality of images to generate a combined image according to some embodiments.

A combined image is then generated for each phase in step S707. The combined image is based on the combined image of each portion that corresponds to a same phase. One example of step S707 is illustrated in FIG. 11. As shown, the combined image $(Z_1, \Phi_1)$ of portion 30 is combined with the combined image $(Z_2, \Phi_1)$ of portion 35 to generate a combined image of the entire scanned volume that corresponds to phase $\Phi_1$ of the periodic motion. FIG. 11 also shows the generation of combined images corresponding to phases $\Phi_2$, $\Phi_3$ and $\Phi_4$.

Figure 12:
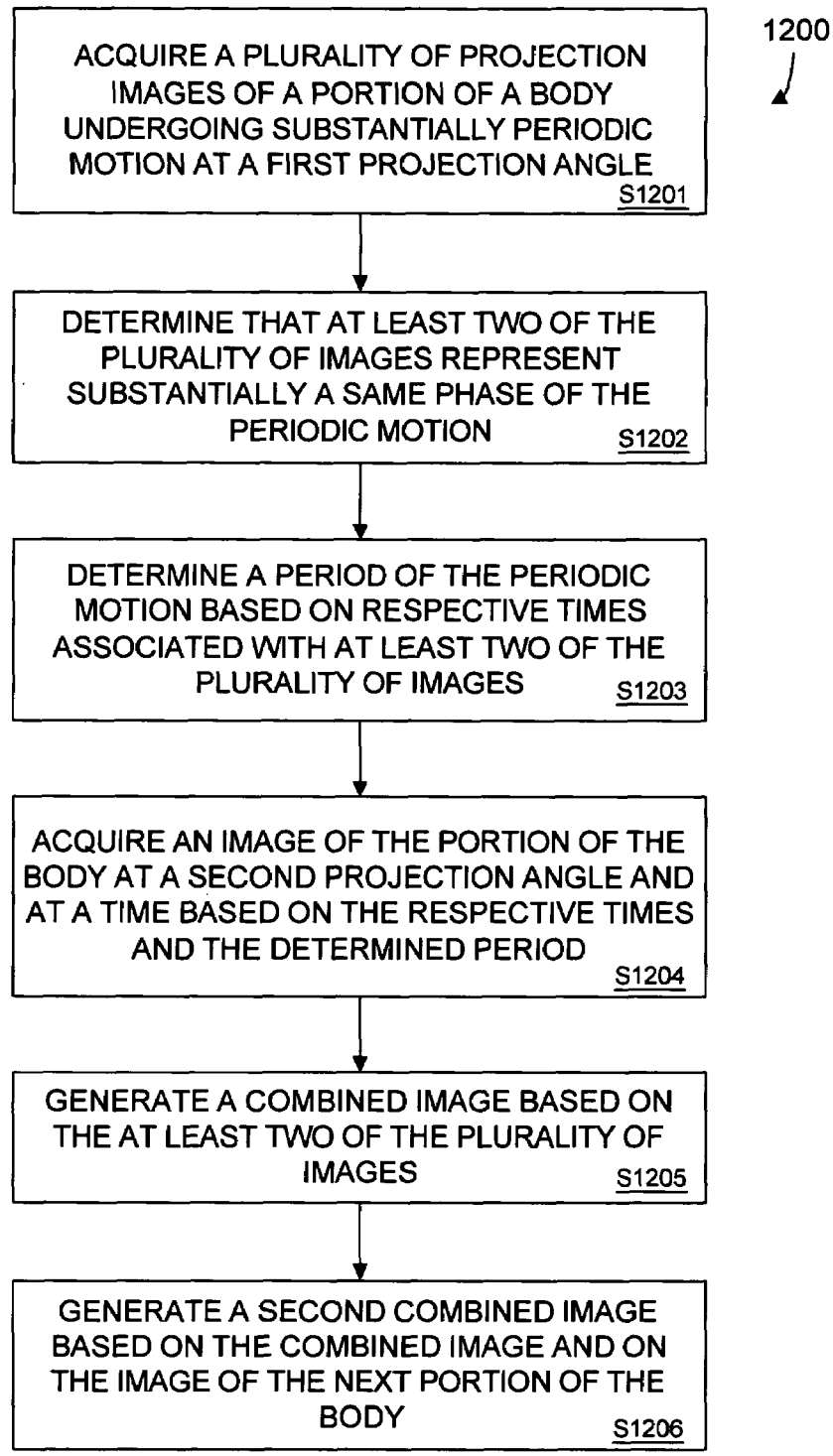
FIG. 12 comprises a flow diagram illustrating process steps according to some embodiments.

FIG. 12 is a flow diagram of process steps 1200 to acquire images of a moving body according to some embodiments. Process steps 1200 may be embodied as described with respect to any of the other process steps discussed herein.

Figure 13:
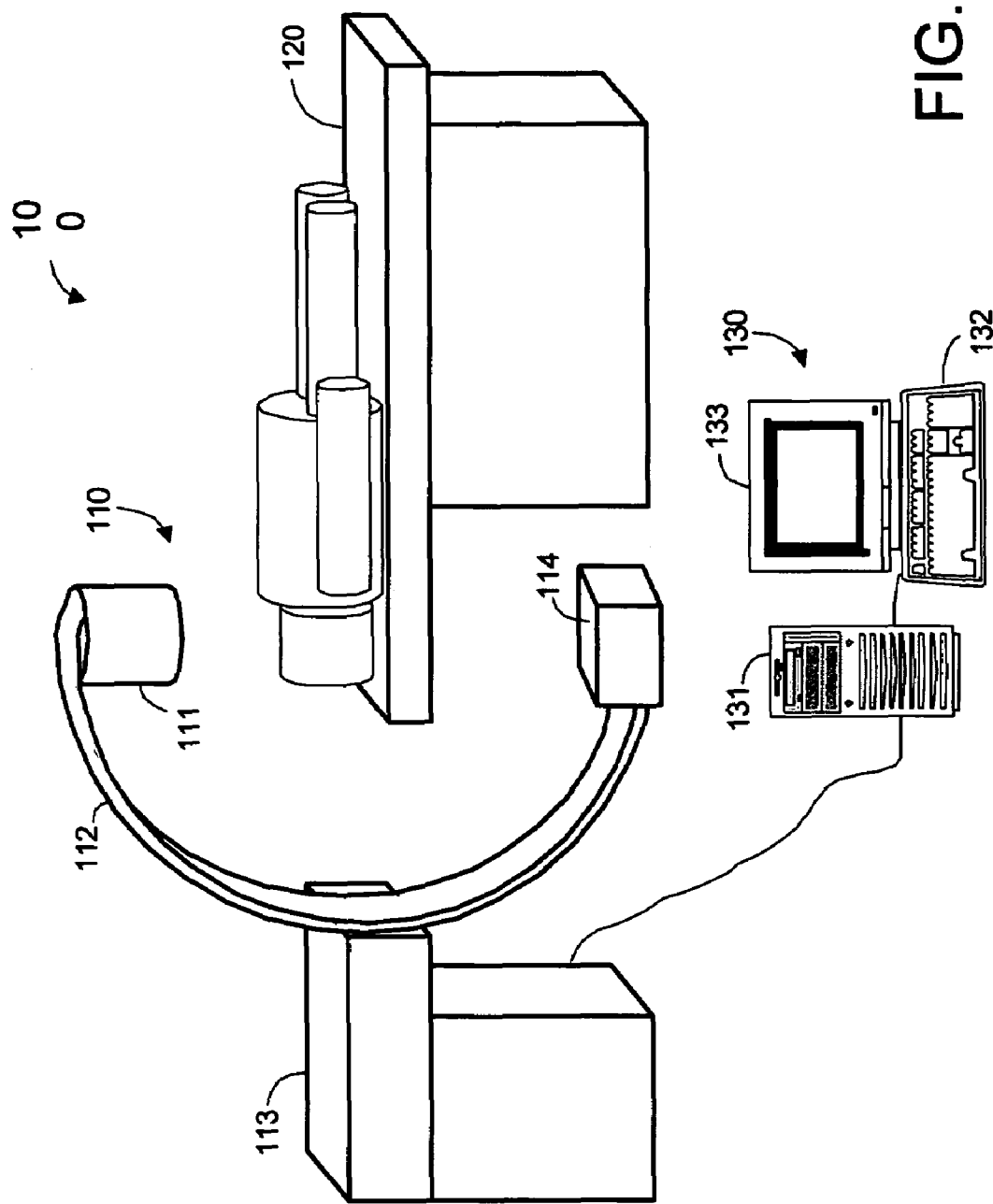
FIG. 13 is a diagram illustrating an image acquisition and/or radiation treatment system according to some embodiments.

Initially, at step S1201, a system operates to acquire a plurality of projection images of a portion of a body undergoing substantially periodic motion. The images are acquired at a first projection angle. FIG. 13 illustrates system 100 to acquire such images according to some embodiments.

System 100 includes kilovoltage imaging system 110, table 120 and operator station 130. Imaging system 110 comprises X-ray tube 111, C-arm 112, base 113 and imaging device 114. X-ray tube 111 may comprise any suitable device to emit imaging radiation, including but not limited to a Diabolo™ x-ray tube. In some embodiments, X-ray tube 111 emits kilovoltage radiation having energies ranging from 50 to 150 keV. Imaging device 114 may comprise a flat-panel imaging device using a scintillator layer and solid-state amorphous silicon photodiodes deployed in a two-dimensional array. The RID1640, offered by Perkin-Elmer®, Inc. of Fremont, Calif., is one suitable device.

Imaging device 114 may comprise other types of imaging devices. For example, X-ray radiation may also be converted to and stored as electrical charge without use of a scintillator layer. In such imaging devices, x-rays are absorbed directly by an array of amorphous selenium photoconductors. The photoconductors convert the x-rays directly to stored electrical charge that comprises an acquired image of a radiation field. Imaging device 114 may also comprise a CCD or tube-based camera. Such an imaging device may include a light-proof housing within which are disposed a scintillator, a mirror, and a camera.

X-ray tube 111 and imaging device 114 may be coupled to C-arm 112 so as to face one another irrespective of any movement of C-arm 112 with respect to base 113. In this regard, C-arm 112 is slidably mounted on base 113 and can therefore be moved in order to change the position of X-ray tube 111 with respect to table 120. In some embodiments, base 113 also includes a high-voltage generator for supplying power used by X-ray tube 111 to generate kilovoltage radiation. Many C-arm/base configurations may be used in conjunction with some embodiments, including configurations in which base 113 is rotatably mounted to a ceiling of a room containing system 100, configurations in which one C-arm is slidably mounted on another C-arm, and configurations incorporating multiple independent C-arms.

Table 120 supports a body during imaging. Table 120 may be adjustable to assist in positioning a portion of the body between X-ray tube 111 and imaging device 114.

Operator station 130 includes processor 131 in communication with an input device such as keyboard 132 and operator display 133. An operator may operate operator station 130 to acquire images according to some embodiments. Operator station 130 may also or alternatively be used to reconstruct three- or four-dimensional images from projection images acquired by imaging system 110.

Figure 14:
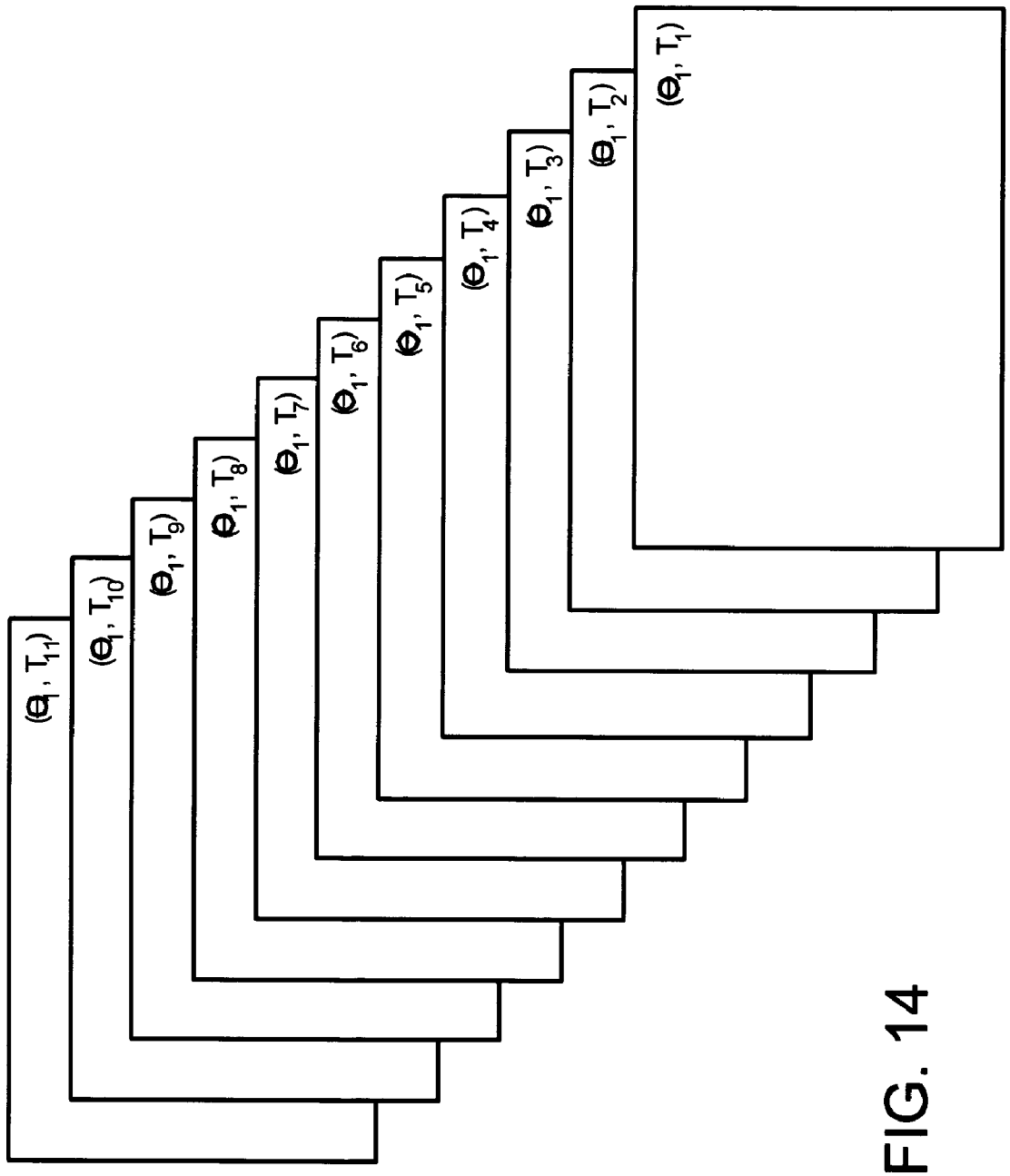
FIG. 14 includes representations of a plurality of images acquired according to some embodiments.

Returning to step S1201, it will be assumed that images $(\Theta_1, T_1)$ through $(\Theta_1, T_{11})$ of FIG. 14 are acquired therein. These projection images may be acquired by any currently- or hereafter-known system to acquire projection images. Next, it is determined in step S1202 that at least two of the plurality of images represent substantially a same phase of periodic motion of the subject body. This determination may be made using any technique described herein or otherwise known.

For the present example, it will be assumed that FIG. 4 represents a plot of a similarity measure computed between image $(\Theta_1, T_1)$ and each other image of FIG. 14. Images $(\Theta_1, T_1)$ $(\Theta_1, T_5)$ and $(\Theta_1, T_9)$ may therefore be identified as representing a same phase of periodic motion. In some embodiments, images $(\Theta_1, T_2)$ $(\Theta_1, T_6)$ and $(\Theta_1, T_{10})$ may be identified in step S1202.

A period of the periodic motion of the subject body is determined in step S1203. The determination may be based on respective times associated with the images identified in step S1202. Continuing the current example, the determined period may be equal to $T_5$-$T_1$.

Figure 15:
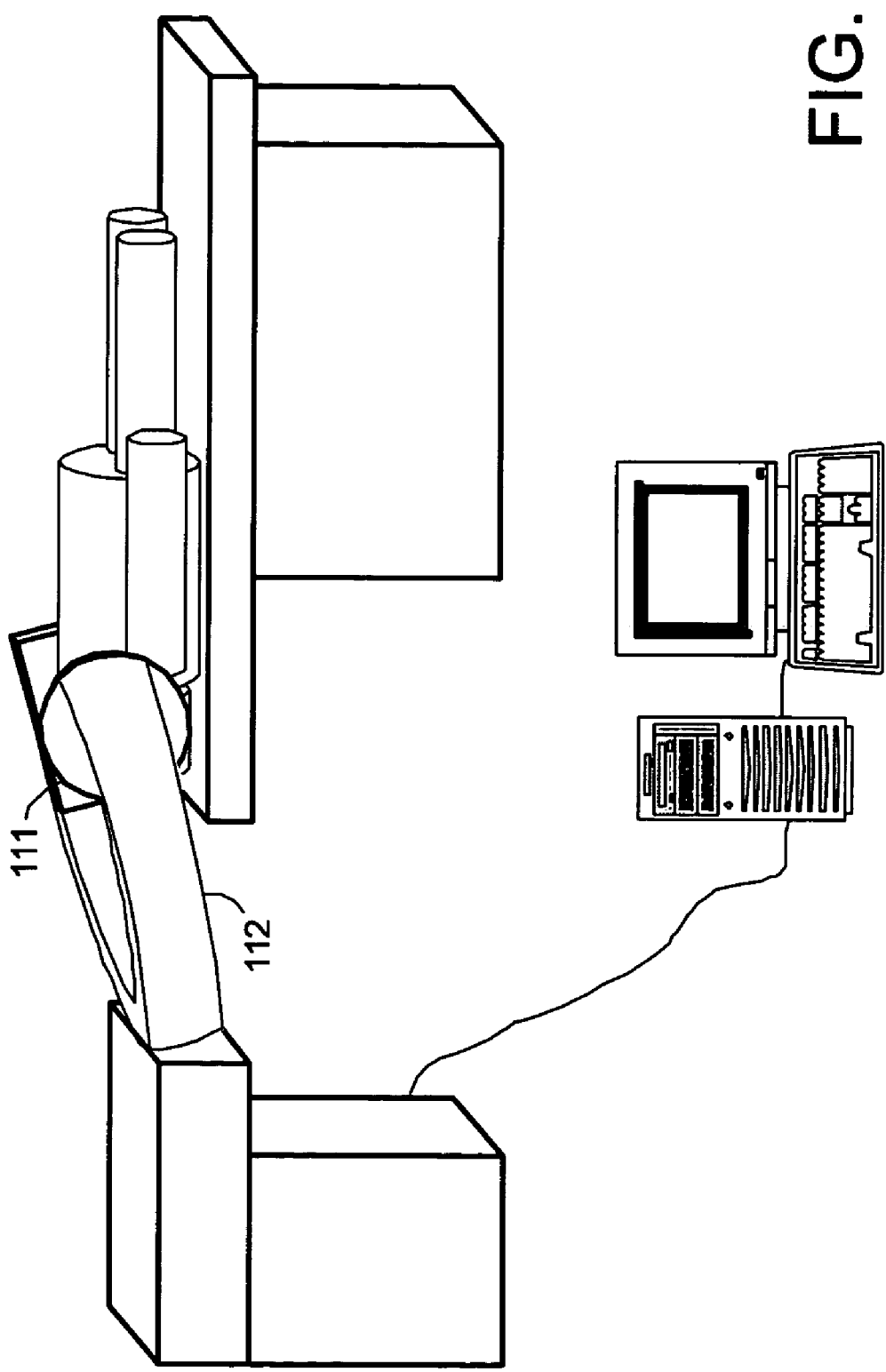
FIG. 15 is a diagram illustrating an image acquisition system according to some embodiments.

Next, in step S1204, a projection image of the portion of the body is acquired at a second projection angle. According to some embodiments of step S1204, the projection angle is changed by moving C-arm 112 to a new position. FIG. 15 illustrates the acquisition of a projection image at a second projection angle according to some embodiments. As shown, C-arm 112 is moved such that the projection angle has changed while the subject portion remains between X-ray tube 111 and imaging device 114.

The image may be acquired in step S1204 based on the determined period and on the times associated with at least one of the images identified in step S1202. More specifically, the image may be obtained at a time equal to a time associated with one of the images identified in step S1202 plus an integer multiple of the determined period. Assuming that the identified images are images $(\Theta_1, T_5)$ and $(\Theta_1, T_9)$, the image of step S1202 may be acquired at time $T_{12}$ shown in FIG. 4. Again, time $T_{12}$ is substantially equal to time $T_9$ (or time $T_5$) plus an integer multiple of the determined period.

The at least two images identified in step S1202 are used to generate a combined image in step S1205. The combined image may be generated using any currently- or hereafter-known methods for combining two or more images. As described with respect to process steps 500, images may be acquired in step S1201 by setting a tube current of X-ray source 111 to less than or equal to half of a standard tube current used for imaging, and by acquiring the images based on the current. A combined image generated based on the identified two or more images in step S1205 may thereby possess an image quality equivalent to an image quality that is obtained using standard tube current.

Figure 16:
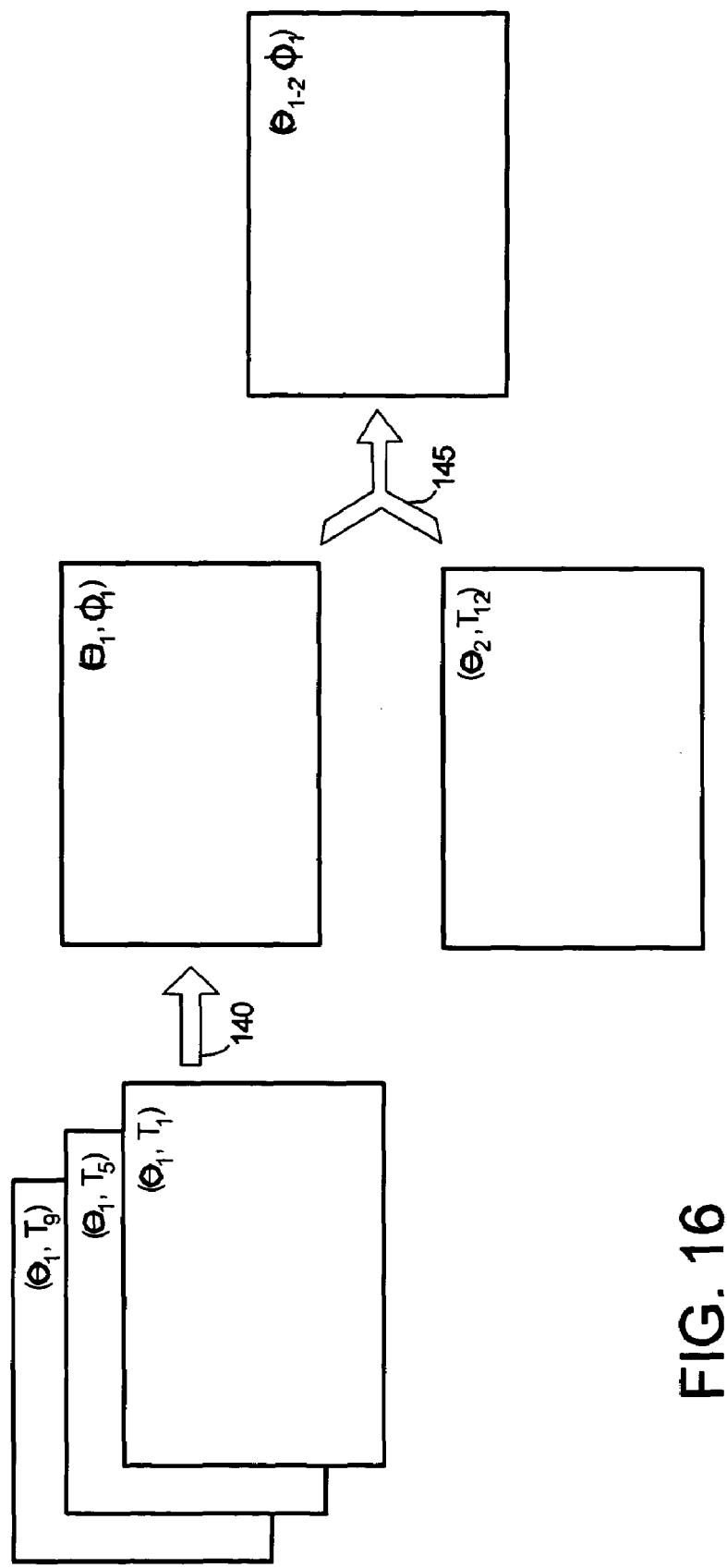
FIG. 16 depicts the combination of a plurality of images to generate a combined image according to some embodiments.

FIG. 16 illustrates the combination of images in step S1205 according to some embodiments. Specifically, arrow 140 indicates the generation of combined image $(\Theta_1, \Phi_1)$ based on images $(\Theta_1, T_1)$, $(\Theta_1, T_5)$ and $(\Theta_1, T_9)$ into. Since each of its component images correspond to a same phase of the periodic motion, combined image $(\Theta_1, \Phi_1)$ is labeled to indicate that it corresponds to a first phase of the periodic motion.

Next, in step S1206, a second combined image is generated based on the combined image generated in step S1205 and on the image acquired in step S1204. Arrow 145 indicates the combination of combined image $(\Theta_1, \Phi_1)$ with image $(\Theta_2, T_{12})$ acquired in step S1204 to generate second combined image $(\Theta_{1-2}, \Phi_1)$. Again, since image $(\Theta_2, T_{12})$ corresponds to a same phase of the periodic motion as $(\Theta_1, T_1)$, $(\Theta_1, T_5)$ and $(\Theta_1, T_9)$, the second combined image is also labeled to indicate that it corresponds to the first phase of the periodic motion.

In some embodiments of step S1204, a plurality of images of the portion is acquired at the second projection angle. It may then be determined that at least two of the images substantially represent a same phase of motion as described with respect to step S1202, and the period of motion may be determined based thereon as described with respect to step S1203. The determined period may be used to update the period determined in step S1202.

Moreover, in some embodiments where a plurality of images are acquired in step S1204, step S1204 may be repeated sequentially until a plurality of images are acquired of the portion at several different projection angles. The projection angles may be equally-spaced around the 360 degrees surrounding the portion of interest. Combined images corresponding to each phase of motion at each projection angle may then be generated in step S1205. The images corresponding to each phase at each projection angle may then be combined in step S1206 to create a three-dimensional image of the portion for each phase of motion. These images may be displayed sequentially over time to provide a four-dimensional representation of the portion undergoing periodic motion.

Figure 17:
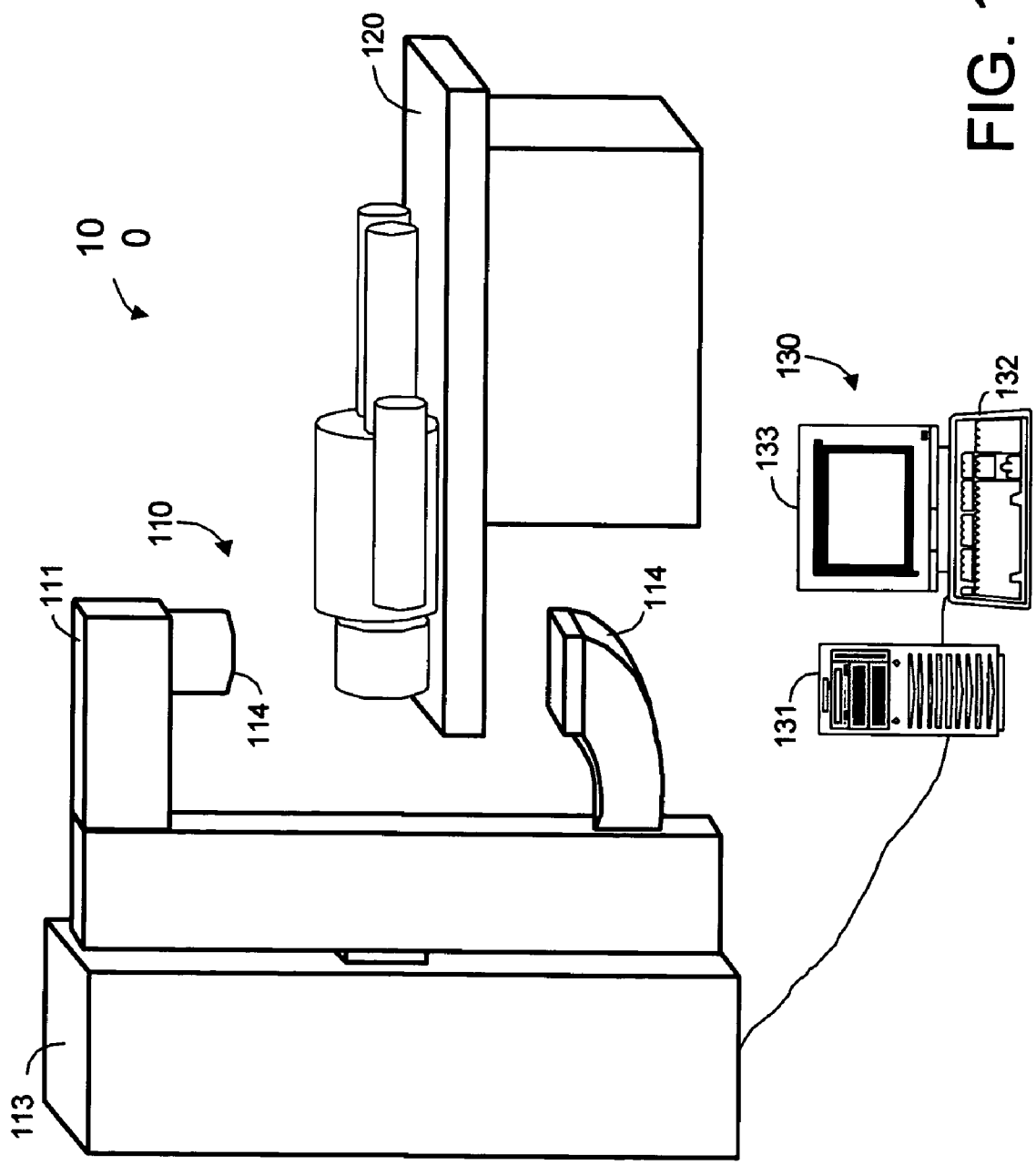
FIG. 17 is a diagram illustrating an image acquisition/radiation treatment system according to some embodiments.

FIG. 17 illustrates system 200 to acquire images according to some embodiments. System 200 includes linear accelerator 210, table 220 and operator station 230. Linear accelerator 210 may be used to deliver treatment radiation as well as radiation used to acquire images according to some embodiments. For example, system 200 may be used to acquire images for verification and recordation of a patient position and of an internal patient portal to which radiation is delivered.

Linear accelerator 210 comprises treatment head 212, imaging device 214, and gantry 216. Examples of linear accelerators that may be suitable in some embodiments include the PRIMUS® and ONCOR® systems offered by Siemens Corporation®. Imaging device 214 may comprise any suitable device, including those described above with respect to imaging device 114.

Gantry 216 may be rotated to dispose treatment head 212 and imaging device 214 at different rotational positions with respect to a body lying therebetween. Gantry 216 may be rotated continuously while imaging radiation is emitted from treatment head 212 during an imaging mode, and may be fixed at a particular rotational position when treatment radiation is emitted from treatment head 212.

Table 220 supports a body during imaging and/or radiation treatment. Table 220 may be adjustable to assist in positioning a portion of the body between treatment head 212 and imaging device 214.

An operator may operate operator station 230 to acquire images according to some embodiments. Operator station 230 may also or alternatively be used to determine correlations between, and to generate combined images from, images acquired by linear accelerator 210 according to some embodiments.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
   acquiring a plurality of images of a first portion of a body undergoing substantially periodic motion;
   determining measure of image similarity between at least two of the plurality of images; and
   determining, based on the measure of image similarity, that the at least two of the plurality of images represent substantially a same phase of the periodic motion.

2. A method according to claim 1, wherein the plurality of images comprise three-dimensional cross-sectional images of the first portion of the body.

3. A method according to claim 2, wherein the images are acquired by a computed tomography scanner.

4. A method according to claim 2, wherein the images are acquired using a linear accelerator.

5. A method according to claim 1, wherein the plurality of images comprise projection images of the first portion of the body.

6. A method according to claim 5, wherein acquiring the plurality of images comprises:
   acquiring the plurality of images at a first projection angle with respect to the body.

7. A method according to claim 6, wherein each of the plurality of images is associated with a respective time, further comprising:
   determining a period of the periodic motion based on the respective times associated with the at least two of the plurality of images; and
   acquiring a projection image of the portion of the body at a second projection angle with respect to the body, the projection image acquired at a time substantially equal to a time associated with one of the at least two of the plurality of images plus an integer multiple of the determined period.

8. A method according to claim 7, further comprising:
   generating a combined projection image based on the at least two of the plurality of images; and
   generating a second combined image based on the combined image and the projection image acquired at a second projection angle with respect to the body.

9. A method according to claim 7, further comprising:
   acquiring a second plurality of images of the portion of the body at a second projection angle with respect to the body, each of the second plurality of images associated with a respective time;
   determining a measure of image similarity between at least two of the second plurality of images; and
   determining, based on the measure of image similarity, that the at least two of the second plurality of images represent substantially a same second phase of the periodic motion.

10. A method according to claim 5, further comprising:
    generating a combined image corresponding to the phase of the periodic motion based on the at least two of the plurality of images.

11. A method according to claim 10, wherein acquiring the plurality of images comprises:
    setting an x-ray tube current to less than or equal to half of a standard x-ray tube current used for imaging; and
    acquiring the least two of the plurality of images based on the x-ray tube current.

12. A method according to claim 5, wherein the projection images are acquired by a C-arm.

13. A method according to claim 5, wherein the projection images are acquired using a linear accelerator.

14. A method according to claim 1, further comprising:
    generating a combined image corresponding to the phase of the periodic motion based on the at least two of the plurality of images.

15. A method according to claim 14, wherein acquiring the plurality of images comprises:
    setting an x-ray tube current to less than or equal to half of a standard x-ray tube current used for imaging; and
    acquiring the least two of the plurality of images based on the x-ray tube current.

16. A method according to claim 1, wherein each of the plurality of images is associated with a respective time, further comprising:

determining a period of the periodic motion based on the respective times associated with the at least two of the plurality of images; and acquiring an image of a second portion of the body at a time substantially equal to a time associated with one of the at least two of the plurality of images plus an integer multiple of the determined period.

17. A method according to claim 16, further comprising:
generating a combined image based on the at least two of the plurality of images; and
generating a second combined image based on the combined image and the image of the second portion of the body.

18. A method according to claim 1, further comprising:
acquiring a second plurality of images of a second portion of the body;
determining a second measure of image similarity between at least two of the second plurality of images; and
determining, based on the second measure of image similarity, that the at least two of the second plurality of images represent substantially a same second phase of the periodic motion.

19. A method according to claim 1, wherein each of the plurality of images is associated with a respective time, further comprising:
determining a period of the periodic motion based on the respective times associated with the at least two of the plurality of images; and
acquiring a second plurality of images of a second portion of the body, each of the second plurality of images associated with a respective time substantially equal to a time associated with one of the at least two of the plurality of images of the first portion of the body plus an integer multiple of the determined period.

20. A method according to claim 19, further comprising:
generating a combined image based on the at least two of the plurality of images;
generating a second combined image based on at least two of the second plurality of images, each of the at least two of the second plurality of images associated with a time substantially equal to a time associated with one of the at least two of the plurality of images of the first portion of a body plus an integer multiple of the determined period; and
generating a third combined image based on the combined image and the second combined image.

21. An apparatus comprising:
a memory storing processor-executable process steps; and
a processor in communication with the memory and operative in conjunction with the stored process steps to:
acquire a plurality of images of a first portion of a body undergoing substantially periodic motion;
determine a measure of image similarity between at least two of the plurality of images; and
determine, based on the measure of image similarity, that the at least two of the plurality of images represent substantially a same phase of the periodic motion.

22. An apparatus according to claim 21, wherein the plurality of images comprise three-dimensional cross-sectional images of the first portion of the body.

23. An apparatus according to claim 22, wherein the images are acquired by a computed tomography scanner.

24. An apparatus according to claim 22, wherein the images are acquired using a linen accelerator.

25. An apparatus according to claim 21, wherein the plurality of images comprise projection images of the first portion of the body.

26. An apparatus according to claim 25, wherein acquisition of the plurality of images comprises:
acquisition of the plurality of images at a first projection angle with respect to the body.

27. An apparatus according to claim 26, wherein each of the plurality of images is associated with a respective time, and wherein the processor is further operative in conjunction with the stored process steps to:
determine a period of the periodic motion based on the respective times associated with the at least two of the plurality of images; and
acquire a projection image of the portion of the body at a second projection angle with respect to the body, the projection image acquired at a time substantially equal to a time associated with one of the at least two of the plurality of images plus an integer multiple of the determined period.

28. An apparatus according to claim 27, the processor further operative in conjunction with the stored process steps to:
generate a combined projection image based on the at least two of the plurality of images; and
generate a second combined image based on the combined image and the projection image acquired at a second projection angle with respect to the body.

29. An apparatus according to claim 27, the processor further operative in conjunction with the stored process steps to:
acquire a second plurality of images of the portion of the body at a second projection angle with respect to the body, each of the second plurality of images associated with a respective time;
determine a measure of image similarity between at least two of the second plurality of images; and
determine, based on the measure of image similarity, that the at least two of the second plurality of images represent substantially a same second phase of the periodic motion.

30. An apparatus according to claim 25, the processor further operative in conjunction with the stored process steps to:
generate a combined image corresponding to the phase of the periodic motion based on the at least two of the plurality of images.

31. An apparatus according to claim 30, wherein acquisition of the plurality of images comprises:
setting of an x-ray tube current to less than or equal to half of a standard x-ray tube current used for imaging; and
acquisition of the least two of the plurality of images based on the x-ray tube current.

32. An apparatus according to claim 25, wherein the projection images are acquired by a C-arm.

33. An apparatus according to claim 25, wherein the projection images are acquired using a linear accelerator.

34. An apparatus according to claim 21, the processor further operative in conjunction with the stored process steps to:
generate a combined image corresponding to the phase of the periodic motion based on the at least two of the plurality of images.

35. An apparatus according to claim 34, wherein acquisition of the plurality of images comprises:
setting of an x-ray tube current to less than or equal to half of a standard x-ray tube current used for imaging; and
acquisition of the least two of the plurality of images based on the x-ray tube current.

36. An apparatus according to claim 21, wherein each of the plurality of images is associated with a respective time, and wherein the processor is further operative in conjunction with the stored process steps to:
- determine a period of the periodic motion based on the respective times associated with the at least two of the plurality of images; and
- acquire an image of a second portion of the body at a time substantially equal to a time associated with one of the at least two of the plurality of images plus an integer multiple of the determined period.

37. An apparatus according to claim 36, the processor further operative in conjunction with the stored process steps to:
- generate a combined image based on the at least two of the plurality of images; and
- generate a second combined image based on the combined image and the image of the second portion of the body.

38. An apparatus according to claim 21, the processor further operative in conjunction with the stored process steps to:
- acquire a second plurality of images of a second portion of the body;
- determine a second measure of image similarity between at least two of the second plurality of images; and
- determine, based on the second measure of image similarity, that the at least two of the second plurality of images represent substantially a same second phase of the periodic motion.

39. An apparatus according to claim 21, wherein each of the plurality of images is associated with a respective time, and wherein the processor is further operative in conjunction with the stored process steps to:
- determine a period of the periodic motion based on the respective times associated with the at least two of the plurality of images; and
- acquire a second plurality of images of a second portion of the body, each of the second plurality of images associated with a respective time substantially equal to a time associated with one of the at least two of the plurality of images of the first portion of the body plus an integer multiple of the determined period.

40. An apparatus according to claim 39, the processor further operative in conjunction with the stored process steps to:
- generate a combined image based on the at least two of the plurality of images;
- generate a second combined image based on at least two of the second plurality of images, each of the at least two of the second plurality of images associated with a time substantially equal to a time associated with one of the at least two of the plurality of images of the first portion of a body plus an integer multiple of the determined period; and
- generate a third combined image based on the combined image and the second combined image.

* * * * *